(No Model.)
J. J. MURPHY.
FILTER SYSTEM.
No. 409,611. Patented Aug. 20, 1889.
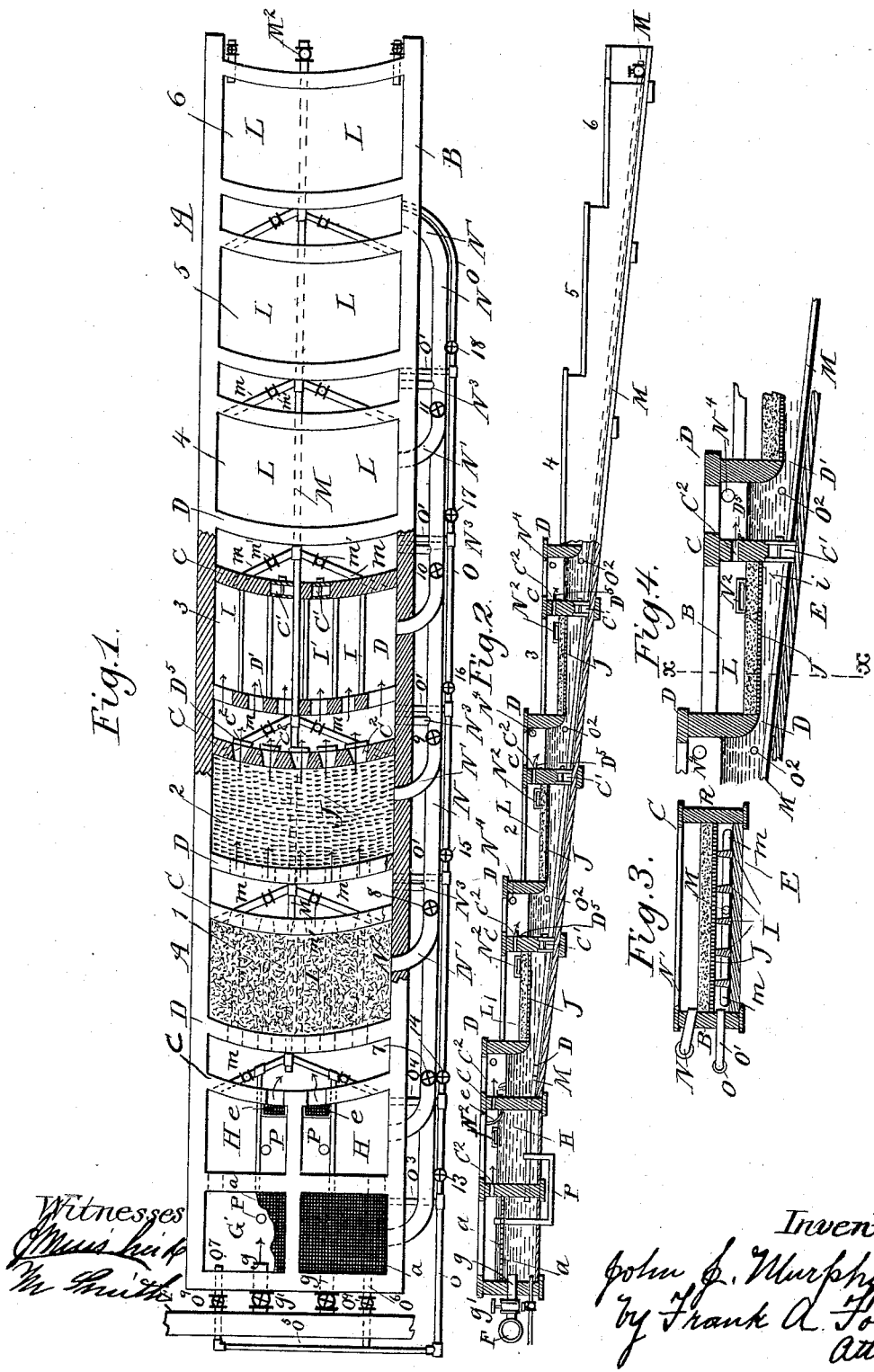
Witnesses
Inventor
John J. Murphy
by Frank A. Fouts
Atty.

UNITED STATES PATENT OFFICE.

JOHN J. MURPHY, OF NEW YORK, N. Y.

FILTER SYSTEM.

SPECIFICATION forming part of Letters Patent No. 409,611, dated August 20, 1889.

Application filed August 24, 1888. Serial No. 283,691. (No model.)

*To all whom it may concern:*

Be it known that I, JOHN J. MURPHY, a citizen of the United States, and a resident of New York, in the county of New York and State of New York, have invented a certain new and useful Filter System, of which the following is a specification.

The object of my invention is to filter city water during its passage down an inclined way and to effect the result by means of a series of similar tanks longitudinally arranged, the arrangement being such that one or more of the tanks may be cut out of the series at pleasure without interfering with the regular flow of water or the process of filtration; and it consists in the parts which will be hereinafter described, and pointed out in the claims.

Reference is herein had to the accompanying drawings, forming part of this specification, in which similar letters of reference indicate corresponding parts.

Figure 1 represents a plan view of my invention, certain parts being broken away and other parts removed for the purpose of illustration. Fig. 2 is a side and sectional elevation; and Figs. 3 and 4 are enlarged details, Fig. 3 being a section on the line X X of Fig. 4.

A B represent the two side walls, which extend the whole length of the system, and C D are curved cross-walls, all of which are provided with coping. The walls are curved for strength. Beneath the walls is a concrete foundation E. A supply-pipe F communicates with the receiving-tanks G G' by means of short pipes $g\ g$, the latter pipes being provided with cocks $g'$. Each receiving-tank is provided with a horizontally-mounted screen $a$. Two tanks H H, which adjoin the receiving-tanks, are provided with screens $e\ e$. Each succeeding tank in the series is of like construction, and they are numbered on the drawings from 1 to 6, inclusive, and the walls C are the dividing-lines, respectively, between the said series. Each wall C is provided near its bottom with two man-holes C', and also provided near its top with a horizontal series of openings $C^2$, these openings being contracted at their inner ends.

The under side of each wall D is provided with a horizontal series of openings D'.

$D^5$ is a ledge or shelf under the outer side of the opening $C^2$, over which the water passes. A series of granite division-walls I are longitudinally seated upon the concrete E, so as to leave an intervening space for water. The forward end of each wall I, where it adjoins the wall C, is cut away on its under side, as shown by dotted lines $i$, Fig. 4. These walls I lie parallel with the side walls, and they extend from each wall D down to the next wall C. A perforated plate J, horizontally mounted, rests upon the granite walls I.

L represents a bed of filtering material which rests upon the plate J. The filter-bed may consist of sand, charcoal, peat, or other preferred substance.

A pipe M extends from a point immediately in advance of the first wall C to the outer end of the last or lowest tank. This pipe rests upon the concrete, and it communicates with the lower corner of each filter compartment or tank (including the tanks H) by means of branch pipes $m$, each branch pipe being provided with a cock $m'$. The upper end of the pipe M is closed, the lower end being provided with a cock $M^2$.

N represents a pipe on the upper outer side of the wall B and extending lengthwise thereof, and N' are branches of said pipe. Each pipe N' communicates with a screen-covered opening $N^2$ in the upper side of each tank excepting the last or lowest one in the series. The pipe N is also provided with a series of branch pipes $N^3$, each of which communicates with an opening $N^4$ in the upper side of the wall B, between the cross-walls C D. The pipe N is also provided with a series of cocks 1, 8, 9, 10, and 11.

O represents a drain-pipe on the lower outer side of the wall B. The pipe O is provided with a series of branch pipes O', each of which communicates with an opening $O^2$ in the lower side of the wall B, between the cross-walls C D. The pipe O is also provided with two branch pipes $O^3\ O^4$, which communicate respectively with openings in the wall B, leading to the tanks G and H. The said pipe O is also provided with a branch pipe $O^5$, the latter pipe being provided with branch pipes $O^6\ O^7$, which communicate with the receiving-tanks G G', respectively. Each pipe $O^6\ O^7$ is provided with a cock $O^9$.

The pipe O is also provided with a series of cocks 13, 14, 15, 16, 17, and 18.

I have shown in Figs. 1 and 2 a pipe P, by means of which water may be conveyed from one tank to another. Both ends of this pipe are open, and the upper end extends up into the receiving-tank above the screen $a$, the other end thereof opening into the adjacent tank H, slightly above the floor. This pipe, however, may be dispensed with, as it is not essential to the operation of my invention.

The operation is as follows: All the cocks are closed except those on the induction-pipes $g$, which connect the supply-pipe F with the receiving-tanks G G'. The water-supply passes into said tanks and rises above the screens $a$, the floating substance being arrested by said screens. The water on reaching the upper openings $C^2$ overflows into the adjacent compartment H, thence through the curved screens $e$, and out of the next series of upper openings $C^2$ in the cross-wall C. The water then overflows into the first of the uniform series of tanks No. 1, passing thence downward through the openings D' in the lower side of the wall D, thence forward to the wall C between the granite walls I, thence upward through the perforated plate J and through the filter-bed L, and thence again through openings $C^2$ in the upper part of the wall C. The water then passes downward and upward through the next succeeding filter-bed, and so on throughout the series.

Any one of the tanks can be cleaned and the sediment removed without interfering with the continuous supply of water or the process of filtration. To clean tank 2, the cocks 8 and 9 in the pipe O are opened. Each opening $N^2$ in the side wall B is lower than the horizontal row of openings $C^2$ in the adjacent wall C. When the cocks 8 and 9 are opened, the water ceases to flow through the openings $C^2$ in both tanks 1 and 2 and flows through the openings $N^2$, and thence through the branch pipe N' and main pipe N. The regular supply of water is thereby carried from tank 1 to tank 3. The cocks 15 and 16 in the pipe O are then opened and the water drained from tank 2 to a lower tank. The branch drain-pipes O' are above the sediment-line. The water and sediment remaining below said pipe are drawn off through the pipe M and the branch pipes $m$, which communicate with the tank to be cleaned. The sediment may be drawn through the pipe M by means of an air-pump.

I am aware that it is not new to secure rapid and thorough filtration and purification of water by upward percolation of water through suitable filtering materials contained in filtering-chambers, and to so arrange the chambers that each may be worked independently of the others when it becomes necessary to cleanse one of them; and I do not claim, broadly, such a construction herein.

Having thus described my invention, I claim as new and desire to secure by Letters Patent of the United States—

1. In a filter system, the inclined longitudinally-arranged tanks having filter-beds above their floors, and the forward wall of each tank provided with discharge-openings above the filter-beds, in combination with an outer longitudinal pipe N, a series of branch pipes N', connecting said pipe with the respective tanks below the discharge-openings in said forward walls, the discharge-pipe and the drain, the drain-pipe O, and the branch pipes O', connecting said pipes O with the respective tanks below the filter-beds, substantially as described.

2. The combination, with the inclined tanks, the longitudinally-arranged outer pipes N and O and their branch pipes connecting with the tanks, of the pipe M, extending longitudinally below the tanks, and the branch pipes $m$, connecting with said tanks, the whole arranged to operate substantially as specified.

Signed at New York, in the county of New York and State of New York, this 16th day of July, A. D. 1888.

JOHN J. MURPHY.

Witnesses:
FRANK A. FOUTS,
ALEXR. MELHADO.